United States Patent
Cherian et al.

(10) Patent No.: US 8,015,420 B2
(45) Date of Patent: Sep. 6, 2011

(54) SYSTEM AND METHOD FOR POWER MANAGEMENT OF A STORAGE ENCLOSURE

(75) Inventors: Jacob Cherian, Austin, TX (US); William Lynn, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 891 days.

(21) Appl. No.: 11/944,026

(22) Filed: Nov. 21, 2007

(65) Prior Publication Data

US 2009/0132838 A1    May 21, 2009

(51) Int. Cl.
G06F 1/26  (2006.01)
G06F 1/32  (2006.01)

(52) U.S. Cl. ......... 713/320; 713/300; 713/324; 713/330

(58) Field of Classification Search .......... 713/300, 713/320, 324, 330
See application file for complete search history.

(56) References Cited

U.S. PATENT DOCUMENTS

| | | | |
|---|---|---|---|
| 6,317,839 B1* | 11/2001 | Wells | 713/320 |
| 7,302,579 B1* | 11/2007 | Cain et al. | 713/182 |
| 7,346,790 B1* | 3/2008 | Klein | 713/320 |
| 2004/0236908 A1* | 11/2004 | Suzuki et al. | 711/114 |
| 2005/0015477 A1* | 1/2005 | Chen | 709/223 |
| 2005/0128722 A1 | 6/2005 | Miller et al. | 361/797 |
| 2005/0133238 A1 | 6/2005 | Miller et al. | 174/52.1 |
| 2005/0268121 A1* | 12/2005 | Rothman et al. | 713/300 |
| 2007/0266211 A1* | 11/2007 | Hiraiwa et al. | 711/162 |
| 2008/0059732 A1* | 3/2008 | Okada et al. | 711/162 |
| 2010/0205462 A1* | 8/2010 | Rauschmayer et al. | 713/300 |

* cited by examiner

*Primary Examiner* — Vincent T Tran
(74) *Attorney, Agent, or Firm* — Baker Botts L.L.P.

(57) ABSTRACT

A system and method for power management of storage enclosures are disclosed. A system may include a storage enclosure and a host communicatively coupled to the storage enclosure. The storage enclosure may include at least one storage resource and a management module. The host may be configured to: (a) communicate data to the at least one storage resource via a particular transmission protocol; (b) communicate a power down command via the particular transmission protocol to the storage enclosure, the power down command operable to transition the storage enclosure from a high-power state to a low-power state; and (c) communicate a power up command via the particular transmission protocol to the storage enclosure, the power up command operable to transition the storage enclosure from the low-power state to the high-power state.

18 Claims, 3 Drawing Sheets

SYSTEM AND METHOD FOR POWER MANAGEMENT OF A STORAGE ENCLOSURE

TECHNICAL FIELD

The present disclosure relates in general to power management, and more particularly to a system and method for power management of storage enclosures.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use an array of storage resources, such as a Redundant Array of Independent Disks (RAID), for example, for storing information. Arrays of storage resources typically utilize multiple disks to perform input and output operations and can be structured to provide redundancy which may increase fault tolerance. Other advantages of arrays of storage resources may be increased data integrity, throughput and/or capacity. In operation, one or more storage resources disposed in an array of storage resources may appear to an operating system as a single logical storage unit or "virtual resource."

Implementations of storage resource arrays can range from a few storage resources disposed in a server chassis, to hundreds of storage resources disposed in one or more separate storage enclosures. As densities of storage resources making up storage arrays have increased, so has the power required for the storage resources making up such arrays, as well as the heat generated by the storage resources. Increases in heat generated by storage resources may require sophisticated cooling systems, which in turn may also increase demand for power.

At times, when a particular storage enclosure is not needed (e.g., when an information handling system using such enclosure is powered down) it may be desirable to power down the storage enclosure. However, traditional approaches to powering down storage enclosures are often less than desirable. For example, one traditional approach to powering down a storage enclosure includes manually switching a power switch on the storage enclosure. One disadvantage of such an approach is that it requires a person to be physically present to power down the enclosure, which is particularly disadvantageous when the storage enclosure is located remotely from an associated information handling system. Another disadvantage is that a person may also have to manually switch the storage enclosure back on when power is again needed.

Another approach includes an "out-of-band" mechanism to power on and power off storage resources remotely using a communication protocol other than the protocol used to communicate data to the storage resources to control an electronic switching mechanism to power down the storage enclosure or enclosed storage resources. For example, a small computer system interface (SCSI) protocol may be used to communicate data between an information handling system and a storage enclosure, while a different protocol (e.g., Ethernet) may be used to communicate control signals that may power off and power on the storage resource or the enclosed storage resources. However, to support such remote power control capabilities, the storage enclosure must be equipped to communicate via two communications protocols, which may add design complexity and/or require numerous connections to the storage enclosure.

Accordingly, a need has arisen for systems and methods that provide remote power management of storage resources without the complexity or other disadvantages incumbent in traditional approaches.

SUMMARY

In accordance with the teachings of the present disclosure, disadvantages and problems associated with the management of power in storage enclosures may be substantially reduced or eliminated.

In accordance with one embodiment of the present disclosure, a system for power management of a storage enclosure may include a storage enclosure and a host communicatively coupled to the storage enclosure. The storage enclosure may include at least one storage resource and a management module. The host may be configured to: (a) communicate data to the at least one storage resource via a particular transmission protocol; (b) communicate a power down command via the particular transmission protocol to the storage enclosure, the power down command operable to transition the storage enclosure from a high-power state to a low-power state; and (c) communicate a power up command via the particular transmission protocol to the storage enclosure, the power up command operable to transition the storage enclosure from the low-power state to the high-power state.

In accordance with another embodiment of the present disclosure, a storage enclosure may include at least one storage resource and a management module. The at least one storage resource may be configured to communicate with a host via a particular transmission protocol. The management module may be configured to: (a) receive a power down command via the particular transmission protocol from the host, the power down command operable to transition the at least one storage resource from a high-power state to a low-power state; and (b) receive a power up command via the particular transmission protocol from the host, the power up command operable to transition the at least one storage resource from the low-power state to the high-power state.

In accordance with a further embodiment of the present disclosure, a method for power management of a storage enclosure is provided. The method may include receiving a command to power down a storage enclosure from a host communicatively coupled to the storage enclosure, the command communicated via a particular transmission protocol used to communicate input/output data between the host and the storage enclosure. In response to the communication of the command to power down the storage enclosure, one or more main power supplies configured to supply power to one or more components disposed in the storage disclosure may be powered down. In addition, in response to receiving the command to power down the storage enclosure, an auxiliary power supply may be maintained to supply power to a device configured receive a command from the host to power on the storage enclosure.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
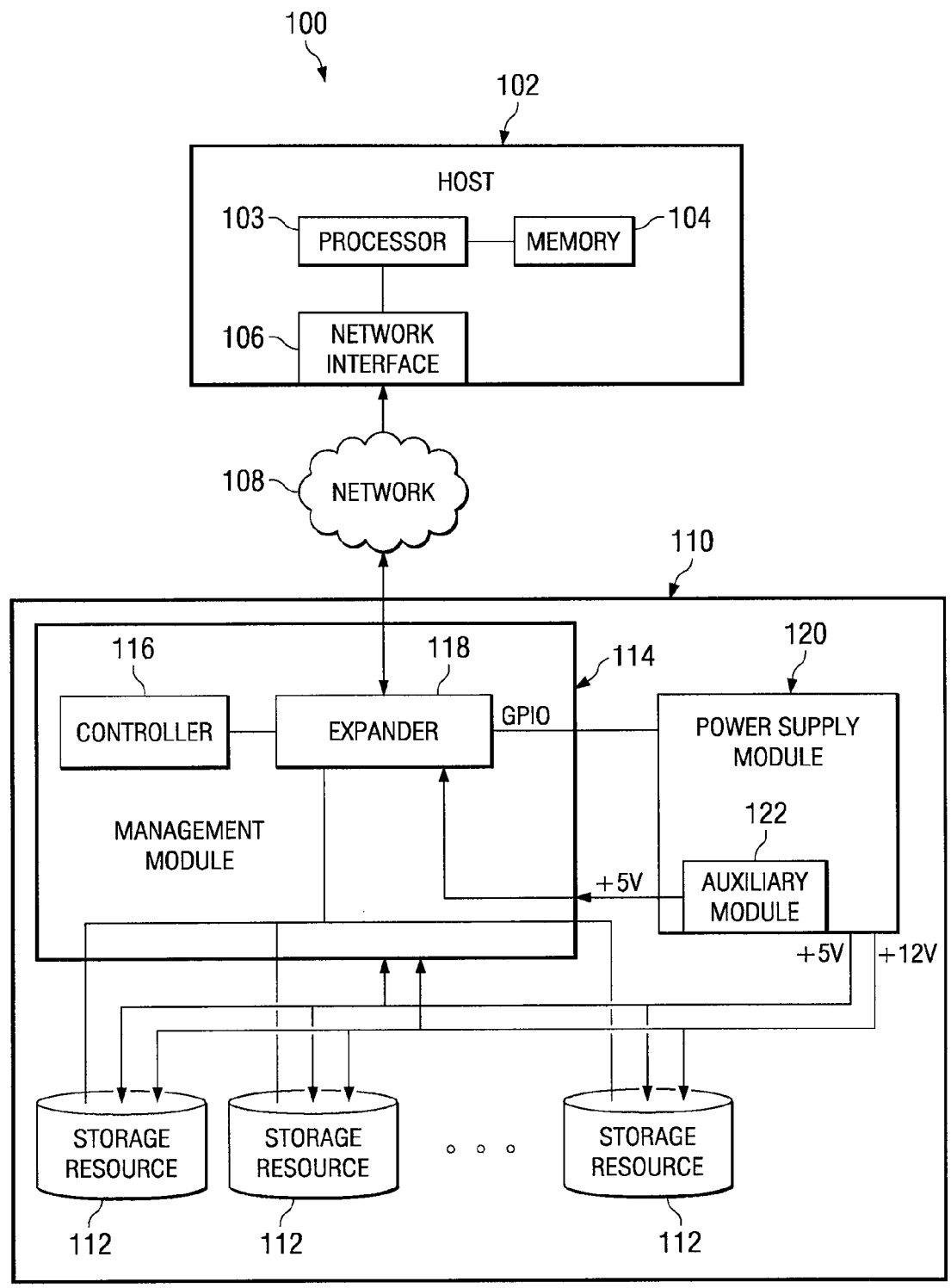
FIG. 1 illustrates a block diagram of an example system for data storage including a storage enclosure, in accordance with an embodiment of the present disclosure.
Figure 2A:
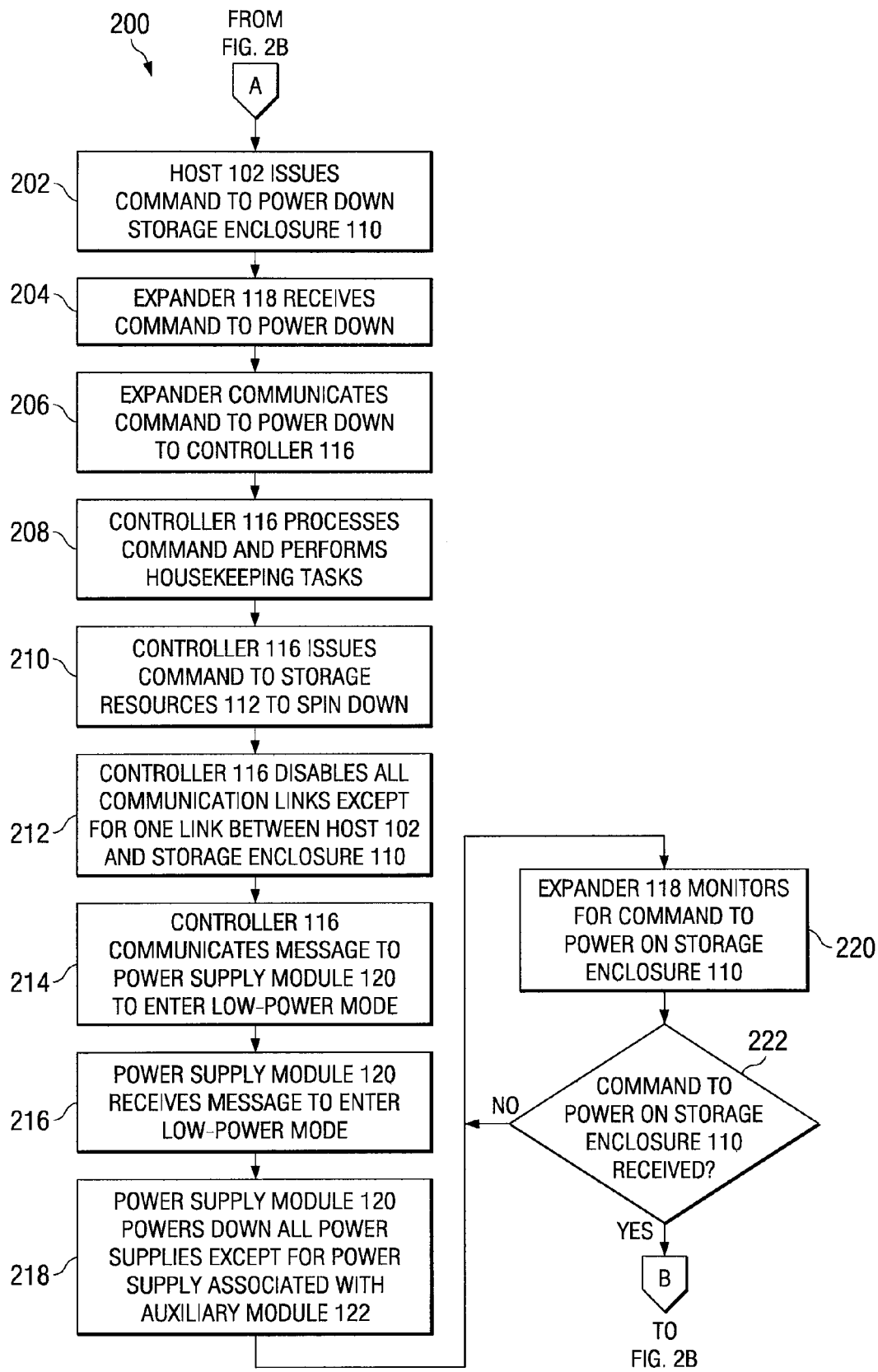
FIGS. 2A and 2B illustrate a flow chart of a method for managing power in a storage enclosure, in accordance with an embodiment of the present disclosure.
Figure 2B:
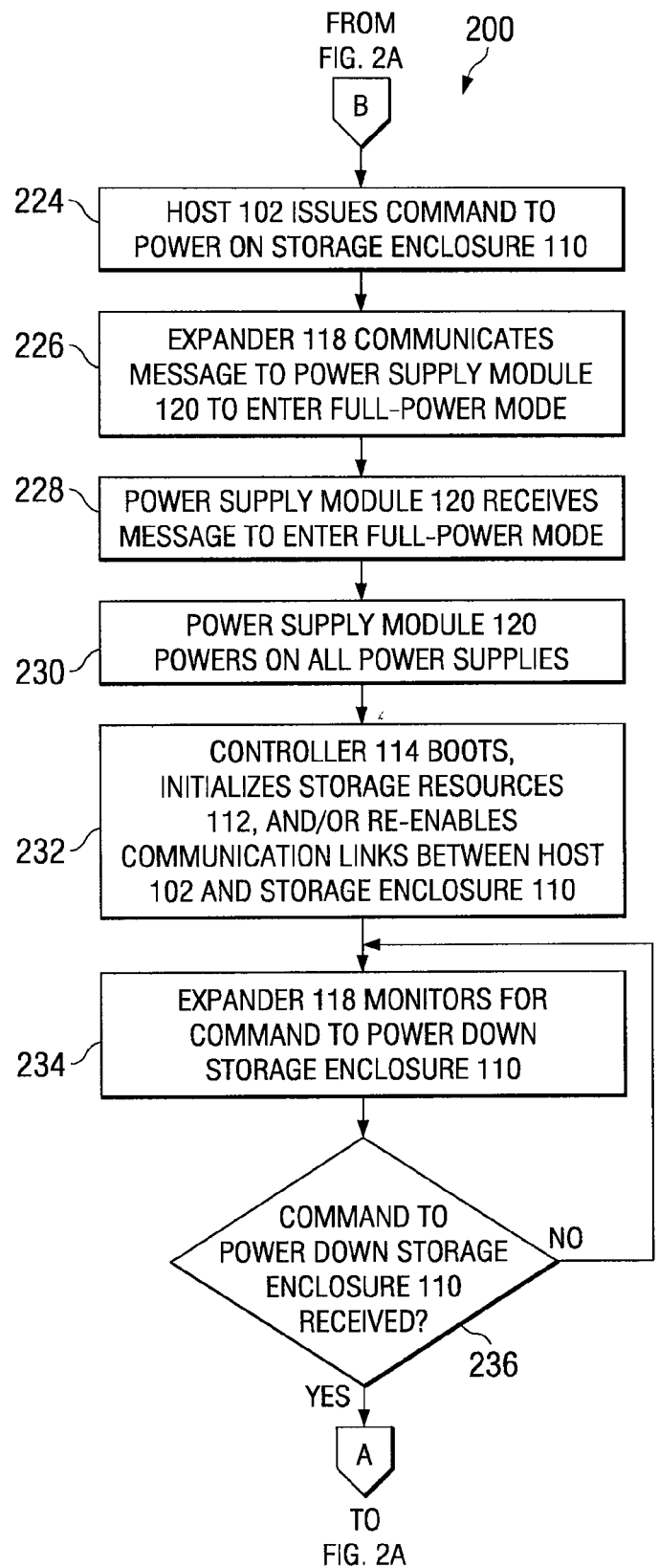

Preferred embodiments and their advantages are best understood by reference to FIGS. 1, 2A and 2B, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage resource, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example system 100 for data storage including a storage enclosure 110, in accordance with an embodiment of the present disclosure. As depicted, system 100 may include a host 102, a network 108, and a storage enclosure 110. Host 102 may comprise an information handling system and may generally be operable to read data from and/or write data to one or more storage resources 112 disposed in storage enclosure 110. In certain embodiments, host 102 may be a server. Although system 100 is depicted as having one host 102, it is understood that system 100 may include any number of hosts 102.

As shown in FIG. 1, host 102 may include a processor 103, memory 104 communicatively coupled to processor 103, a network interface 106 communicatively coupled to processor 103.

Processor 103 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of host 102.

Memory 104 may be communicatively coupled to processor 103 and may comprise any system, device, or apparatus operable to retain program instructions or data for a period of time (e.g., computer-readable media). Memory 104 may comprise random access memory (RAM), electrically erasable programmable read-only memory (EEPROM), a PCM-CIA card, flash memory, magnetic storage, opto-magnetic storage, or any suitable selection and/or array of volatile or non-volatile memory that retains data after power to host 102 is turned off.

Network interface 106 may be any suitable system, apparatus, or device operable to serve as an interface between host 102 and network 108. Network interface 106 may enable host 102 to communicate over network 108 using any suitable transmission protocol and/or standard, including without limitation all transmission protocols and/or standards enumerated below with respect to the discussion of network 108.

Network 108 may be a network and/or fabric configured to couple host 102 to storage enclosure 110. In certain embodiments, network 108 may allow host 102 to connect to storage resources 112 disposed in storage enclosure 110 such that the storage resources 112 appear to host 102 as locally attached storage resources. In the same or alternative embodiments, network 108 may include a communication infrastructure, that provides physical connections, and a management layer, that organizes the physical connections, storage resources 112 of storage enclosure 110, and host 102. In the same or alternative embodiments, network 108 may allow block I/O services and/or file access services to storage resources 112 disposed in storage enclosure 110.

Network 108 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 108 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), advanced technology attachment (ATA), serial ATA (SATA), advanced technology attachment packet interface (ATAPI), serial storage architecture (SSA), integrated drive electronics (IDE), and/or any combination thereof. Network 108 and its various components may be implemented using hardware, software, or any combination thereof. In the particular embodiment shown in FIG. 1, network 108 may enable communication via serial attached SCSI (SAS) bus technology.

As depicted in FIG. 1, storage enclosure 110 may be configured to hold and power one or more storage resources 112. Storage enclosure 110 may be communicatively coupled to host 102 and/or network 108 to facilitate communication of media between host 102 and storage resources 112. Storage resources 112 may include hard disk drives, magnetic tape libraries, optical disk drives, magneto-optical disk drives, compact disk drives, compact disk arrays, disk array controllers, other computer-readable media, and/or any other system, apparatus or device operable to store media.

In addition to storage resources 112, storage enclosure 110 may include a management module 114 and a power supply module 120. Management module 114 (which may also be referred to as an enclosure management module or EMM) may be communicatively coupled to network 108 and storage enclosures 112. Management module 114 may be configured to issue commands and/or other signals to manage and/or control storage resources 112 and/or power supply module 120. Management module 114 may also be configured to route data from host 102 to one or more destination storage resources 112 and/or from one or more source storage resources 112 to host 102.

Although the embodiment shown in FIG. 1 depicts storage enclosure 110 having three storage resources 112, storage enclosure 110 may have any number of storage resources 112. In addition, although system 100 is depicted as having one storage enclosure 110, system 100 may include any number of storage enclosures 110.

As depicted in FIG. 1, management module 114 may include a controller 116 communicatively coupled to storage resources 112 and an expander 118 communicatively coupled to controller 116 and storage resources 112. Controller 116 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In certain embodiments, controller 116 may be configured to issue commands and/or other control signals to manage and/or control expander 118 and/or storage resources 112.

Expander 118 may generally be operable to facilitate communication between network 108 and storage resources 112. In some embodiments, expander 118 may serve to permit a relatively small number of communication links (e.g., four) between network interface 108 and management module 114 to communicate with a greater number (e.g., 24) of storage resources 112. Thus, expander 118 may provide a switching mechanism and/or storage resource addressing mechanism that allows host 102 to communicate with numerous storage resources 112 via a limited number of communication links and/or channels. Accordingly, an expander 118 may operate like an Ethernet hub or network switch that allows multiple systems to be connected using a single switch port (or relatively few switch ports). In the embodiment depicted in FIG. 1, expander 118 may comprise a SAS expander configured to enable communication between host 102 and storage resources 112 via SAS bus technology.

Power supply module 120 may include any device, system, or apparatus operable to supply electrical energy to management module 114, storage resources 112, and/or other components of storage enclosure 110. Power supply module 120 may be configured to supply one or more operating voltages to components of storage enclosure 110. For example, as shown, power supply module 120 may supply operating voltages of 12 volts and 5 volts to management module 114, storage resources 112, and/or other components of storage enclosure 110 depending on the voltage and power requirements of such components.

In addition, power supply module 120 may include an auxiliary module 122. Auxiliary module 122 may be configured to provide a particular voltage (e.g., 5 volts) to one or more selected components of storage enclosure 110, as discussed in greater detail below.

In operation, system 100 may be utilized to provide "in-band" power control of storage enclosure 110. That is, system 100 may facilitate transmission of power control signals from host 102 to storage enclosure 110 via the same communication protocol and/or standard by which data is communicated between host 102 and storage enclosure 110 (e.g., a SCSI-based protocol, such as SAS for example).

For example, to remotely power down storage enclosure 110 and its components and/or cause them to enter a low-power mode (e.g., a "standby" or "sleep" mode), host 102 may issue an appropriate command to storage enclosure 110 via network 108. In certain embodiments, such command may include a vendor-specific SAS management protocol (SMP) command. Expander 118 may receive the command and communicate it to controller 116. Controller 116 may then process the command and perform appropriate housekeeping tasks. For example, controller 116 may update logs and may issue commands to "spin down" storage resources 112 to place them in a low-power state.

Controller 116 may then disable all but one communication links between host 102 and storage enclosure 110 and communicate to power supply module 120 a message to enter into a low power mode. In one embodiment, as shown in FIG. 1, controller 116 may communicate this message by writing to a general purpose input/output (GPIO) register of expander 118 to set a particular signal to an appropriate value (e.g., setting the signal to "low" to indicate that storage enclosure 110 has entered a low-power mode). For purposes of illustration in this disclosure, this signal will be referred to as "PS_ON."

Power supply module 120 may receive the message indicating that storage enclosure 110 has entered a low-power mode (e.g., by sensing that PS_ON has been set "low"), and may accordingly power down each of its associated power supplies (e.g., its 5-volt and 12-volt power supplies), except for the power supply associated with auxiliary module 122 (e.g., a 5-volt power supply). In this manner, power supply module 120 may withdraw power to storage resources 112, controller 116, and/or other components of storage enclosure 110. Auxiliary module 122 may be configured to supply a particular voltage (e.g., 5 volts) to selected components of storage enclosure 110 (e.g., management module 114) so that storage enclosure 110 may receive a command from host 102 to power up from its reduced power state.

To power on storage enclosure 110 from its reduced power state, a command may be communicated from host 102 to storage enclosure 110. For example, the command may be communicated via a network link that remained active during the power down process described above. In certain embodiments, such command may include a vendor-specific SAS management protocol (SMP) command. In certain embodiments, the command issued by host 102 may write directly to the GPIO register of expander 118 to set the PS_ON signal to "high," indicating that storage enclosure 110 is to enter a fully-powered state. In other embodiments, the command issued by host 102 may instruct an internal processor of expander 118 to write to the GPIO register to set the PS_ON signal to "high."

Power supply module 120 may receive the message indicating that storage enclosure 110 has entered a full-power mode (e.g., by sensing that PS_ON has been set "high"), and may accordingly power up each of its associated power supplies (e.g., its 5-volt and 12-volt power supplies) to provide power to controller 114, storage resources 112, and/or other components of storage enclosure 110. The re-establishment of power to controller 114 may cause controller 114 to boot, initialize storage resources 112, and/or re-enable communication links between host 102 and storage enclosure 110 so that host 102 may again communicate data to and from storage enclosure 110.

Although FIG. 1 depicts that host 102 is communicatively coupled to storage enclosure 110 via network 108, host 102 may be communicatively coupled to storage enclosures 110 without the need of network 108 or another similar network. For example, in certain embodiments, one or more storage enclosures 110 may be directly coupled and/or locally attached to host 102.

FIGS. 2A and 2B illustrate a flow chart of an example method 200 for power management of storage enclosure 110, in accordance with an embodiment of the present disclosure. According to one embodiment, method 200 preferably begins at step 202. As noted above, teachings of the present disclosure may be implemented in a variety of configurations of system 100. As such, the preferred initialization point for method 200 and the order of the steps 202-236 comprising method 200 may depend on the implementation chosen.

At step 202, host 102 may issue a command via network 108 to storage enclosure 110 instructing storage enclosure 110 to power down and/or enter a low-power mode (e.g., a "standby" or "sleep" mode). In certain embodiments, the command issued at step 202 may include a vendor-specific SAS management protocol (SMP) command. At step 204, expander 118 may receive the command to power down storage enclosure 110 via a network link between host 102 and storage enclosure 110. In certain embodiments, such link may comprise a SAS link. At step 206, expander 118 may communicate a command to controller 116 indicating that storage enclosure 110 is to be powered down.

At step 208, controller 116 may process the command issued at step 206 and perform housekeeping tasks. For example, controller 116 may cause management module 114 and other components of storage enclosure 110 to update logs and flush caches to ensure that all non-committed data is stored to storage resources 112. At step 210, controller 116 may issue a command to storage resources 112 to spin down in order to place them in a low-power state. At step 212, controller 116 may disable all communication links between host 102 and storage enclosure 110 except for one link.

At step 214, controller 116 may communicate a message to power supply module 120 to enter a low-power mode. In some embodiments, controller 116 may communicate such message may by writing to a general purpose input/output (GPIO) register of expander 118 to set a particular signal (e.g., a signal "PS_ON" as described above with respect to FIG. 1) to an appropriate value (e.g., setting the signal to "low" to indicate that storage enclosure 110 has entered a low-power mode). At step 216, power supply module 120 may receive the message to enter a low-power mode (e.g., by sensing that PS_ON has been set "low").

At step 218, power supply module 120 may power down all power supplies (e.g., its 5-volt and 12-volt power supplies), except for the power supply associated with auxiliary module 122, thus withdrawing power to storage resources 112, controller 116, and/or other components of storage enclosure 110. Auxiliary module 122 may remain powered on to supply a particular voltage (e.g., 5 volts) to selected components of storage enclosure 110 (e.g., expander 118 of management module 114) so that such selected components may receive further signals from host 102 (e.g., to allow storage enclosure 110 to receive a command from host 102 to power up from its reduced power state).

At step 220, expander 118 may monitor for a command from host 102 to power on storage enclosure 110 and/or remove it from its low-power state. At step 222, if a command to power on storage enclosure 110 is received, method 200 may proceed to step 224. Otherwise, expander 118 may continue to monitor for a command to power on storage enclosure 110.

At step 224, host 102 may issue a command to power on storage enclosure 110 and/or remove it from its low-power state. For example, the command may be communicated via a network link that remained active during the power down process described with respect to steps 202 to 222 above. In certain embodiments, such command may include a vendor-specific SAS management protocol (SMP) command. At step 226, expander 118 may communicate a message to power supply module 120 to enter a high-power or regular-power mode. In certain embodiments, the command issued by host 102 may write directly to the GPIO register of expander 118 to set a signal (e.g., PS_ON) to "high," thus indicating that storage enclosure 110 is to enter a high-powered or regularly-powered state. In other embodiments, the command issued by host 102 may instruct an internal processor of expander 118 to write to the GPIO register to set the PS_ON signal to "high."

At step 228, power supply module 120 may receive the message to enter a high-power or regular-power mode (e.g., by sensing that PS_ON has been set "high"). In response, at step 230, power supply module 120 may power on all of its power supplies (e.g., its power supplies other than the power supply of auxiliary module 122) to provide power to controller 114, storage resources 112, and/or other components of storage enclosure 110. At step 232, the re-establishment of power to controller 114 may cause controller 114 to boot, initialize storage resources 112, and/or re-enable communication links between host 102 and storage enclosure 110 so that host 102 may again communicate data to and from storage enclosure 110.

At step 234, expander 118 may monitor for a command from host 102 to power down storage enclosure 110. At step 236, if a command to power on storage enclosure 110 is received, method 200 may proceed to step 202. Otherwise, expander 118 may continue to monitor for a command to power down storage enclosure 110.

Although FIGS. 2A and 2B disclose a particular number of steps to be taken with respect to method 200, it is understood that method 200 may be executed with greater or lesser steps than those depicted in FIG. 2. In addition, although FIG. 2 discloses a certain order of steps to be taken with respect to method 200, the steps comprising method 200 may be completed in any suitable order. For example, in certain embodiments, steps 210-214 may execute in any order and/or substantially contemporaneously with each other.

Method 200 may be implemented using system 100 or any other system operable to implement method 200. In certain embodiments, method 200 may be implemented partially or fully in software embodied in computer-readable media.

Although the present disclosure has been described in detail, it should be understood that various changes, substitutions, and alterations can be made hereto without departing from the spirit and the scope of the invention as defined by the appended claims.

What is claimed is:

1. A system for power management of a storage enclosure, comprising:
   a host; and
   a storage enclosure comprising:
      at least one storage resource configured to communicate with the host via a particular transmission protocol;
      a management module configured to:
         receive a power down command via the particular transmission protocol;
         in response to the receipt of the power down command, set a variable indicating that the storage enclosure is to be placed in a low-power state
         receive a power up command via the particular transmission protocol; and
         in response to receipt of the power up command, set a variable indicating that the storage enclosure is to be placed in a high-power state,
      a power supply module comprising:
         at least one power supply configured to supply electrical energy to the at least one storage resource when the variable indicating that the storage enclosure is to placed in the high-power state; and
         an auxiliary power supply configured to supply electrical energy to the management module when the variable indicating that the storage enclosure is to placed in the low-power state.

2. A system according to claim 1, wherein the particular transmission protocol comprises a small computer system interface (SCSI) protocol.

3. A system according to claim 2, wherein the particular transmission protocol comprises serial attached SCSI (SAS).

4. A system according to claim 3, at least one of the power down command and the power up command comprising a vendor-specific SAS management protocol (SMP) command.

5. A system according to claim 1, the auxiliary power supply configured to maintain at least one communication link between the host and the storage enclosure when the storage enclosure is in the low-power state.

6. A system according to claim 1, the management module including an expander and wherein at least one of the variable indicating that the storage enclosure is to be placed in a low-power state and the variable indicating that the at least one storage resource is to be placed in a high-power state includes a general purpose input/output (GPIO) register of the expander.

7. A storage enclosure, comprising:
   at least one storage resource configured to communicate with a host via a particular transmission protocol;
   a management module configured to:
      receive a power down command via the particular transmission protocol from the host;
      in response to the receipt of the power down command, set a variable indicating that the at least one storage resource is to be placed in a low-power state
      receive a power up command via the particular transmission protocol from the host; and
      in response to the receipt of the power down command, set a variable indicating that the at least one storage resource is to be transitioned in a high-power state;
      and a power supply module comprising:
         at least one power supply configured to supply electrical energy to the at least one storage resource when the variable indicating that the at least one storage resource is to be placed in the high-power state; and
         an auxiliary power supply configured to supply electrical energy to the management module when the variable indicating that the at least one storage resource is to be placed in the low-power state.

8. A storage enclosure according to claim 7, wherein the particular transmission protocol comprises a small computer system interface (SCSI) protocol.

9. A storage enclosure according to claim 8, wherein the particular transmission protocol comprises serial attached SCSI (SAS).

10. A system according to claim 9, at least one of the power down command and the power up command comprising a vendor-specific SAS management protocol (SMP) command.

11. A storage enclosure according to claim 7, the auxiliary power supply configured to maintain at least one communication link between the host and the storage enclosure when the storage enclosure is in the low-power state.

12. A storage enclosure according to claim 7, the management module including an expander and wherein at least one of the variable indicating that the at least one storage resource is to be placed in a low-power state and the variable indicating that the at least one storage resource is to be placed in a high-power state includes a general purpose input/output (GPIO) register of the expander.

13. A method for power management of a storage enclosure, comprising:
   receiving a command to power down a storage enclosure from a host communicatively coupled to the storage enclosure, the command communicated via a particular transmission protocol used to communicate input/output data between the host and the storage enclosure;
   in response to the communication of the command to power down the storage enclosure, setting a variable indicating that the storage enclosure is to be placed in a low-power state;
   receiving a command to power up the storage enclosure from the host, the command communicated via the particular transmission protocol;
   in response to the communication of the command to power up the storage enclosure, setting a variable indicating that the storage enclosure is to be placed in a high-power state;
   maintaining at least one power supply to supply electrical energy to one or more storage resources of the storage enclosure when the variable indicating that the at least one storage resource is to placed in the high-power state; and
   maintaining an auxiliary power supply to supply electrical energy to the one or more storage resources of the storage enclosure when the variable indicating that the at least one storage resource is to placed in the low-power state.

14. A method according to claim 13, wherein the particular transmission protocol comprises a small computer system interface (SCSI) protocol.

15. A method according to claim 14, wherein the particular transmission protocol comprises serial attached SCSI (SAS).

16. A system according to claim 15, at least one of the power down command and the power up command comprising a vendor-specific SAS management protocol (SMP) command.

17. A method according to claim 13, further comprising disabling all but one communication link between the host and the storage enclosure when the variable indicating that the at least one storage resource is to placed in the low-power state.

18. A system according to claim 13, further wherein at least one of setting the variable indicating that the storage enclosure is to be placed in a low-power state and setting the variable indicating that the at least one storage resource is to be placed in a high-power state includes setting a general purpose input/output (GPIO) register of an expander.

* * * * *